United States Patent
Santaus et al.

(10) Patent No.: US 12,235,983 B2
(45) Date of Patent: Feb. 25, 2025

(54) SYSTEM AND METHOD FOR FILE RECOVERY FROM MALICIOUS ATTACKS

(71) Applicant: Dell Products L.P., Round Rock, TX (US)

(72) Inventors: Benjamin Edward Santaus, Somerville, MA (US); Dale Robert Bremner, Wrentham, MA (US)

(73) Assignee: Dell Products L.P., Round Rock, TX (US)

( * ) Notice: Subject to any disclaimer, the term of this patent is extended or adjusted under 35 U.S.C. 154(b) by 407 days.

(21) Appl. No.: 17/881,673

(22) Filed: Aug. 5, 2022

(65) Prior Publication Data

US 2024/0045981 A1 Feb. 8, 2024

(51) Int. Cl.
*G06F 21/62* (2013.01)
*G06F 21/55* (2013.01)
*G06F 21/60* (2013.01)

(52) U.S. Cl.
CPC ........ *G06F 21/6218* (2013.01); *G06F 21/554* (2013.01); *G06F 21/602* (2013.01); *G06F 2221/031* (2013.01)

(58) Field of Classification Search
CPC .. G06F 21/554; G06F 21/602; G06F 21/6218; G06F 2221/031
See application file for complete search history.

(56) References Cited

U.S. PATENT DOCUMENTS

| | | | | |
|---|---|---|---|---|
| 9,473,421 | B1 * | 10/2016 | Basil | G06F 13/14 |
| 9,798,863 | B2 * | 10/2017 | Grab | H04N 21/8355 |
| 10,642,917 | B2 * | 5/2020 | Ricker | H04L 9/065 |
| 2008/0243953 | A1 * | 10/2008 | Wu | G06F 11/1453 |
| 2014/0289515 | A1 * | 9/2014 | Sorotokin | H04L 63/08 |
| | | | | 713/176 |
| 2014/0344850 | A1 * | 11/2014 | Wajs | H04N 21/4623 |
| | | | | 725/31 |
| 2021/0126771 | A1 * | 4/2021 | Bae | G06F 21/602 |
| 2021/0334412 | A1 * | 10/2021 | Kalaboukis | G06F 16/182 |
| 2022/0124078 | A1 * | 4/2022 | Erickson | H04L 9/0894 |
| 2024/0045981 | A1 * | 2/2024 | Santaus | G06F 21/602 |

* cited by examiner

*Primary Examiner* — Gary S Gracia
(74) *Attorney, Agent, or Firm* — Chamberlain, Hrdlicka, White, Williams & Aughtry; Aly Z. Dossa

(57) ABSTRACT

A file recovery method executed by a storage device among a plurality of storage devices is provided. The file recovery method includes: detecting that the storage device is compromised and deleting file slices and an original encryption key from the storage of the storage device; after the deleting, generating a new encryption key different from the original encryption key; and instantiating a file recovery method to obtain the previously stored file slices on the compromised storage device from other non-compromised storage devices and to distribute new file slices encrypted using the new encryption key to non-compromised storage devices storing file slices encrypted using the old encryption key of the comprised storage device.

20 Claims, 15 Drawing Sheets

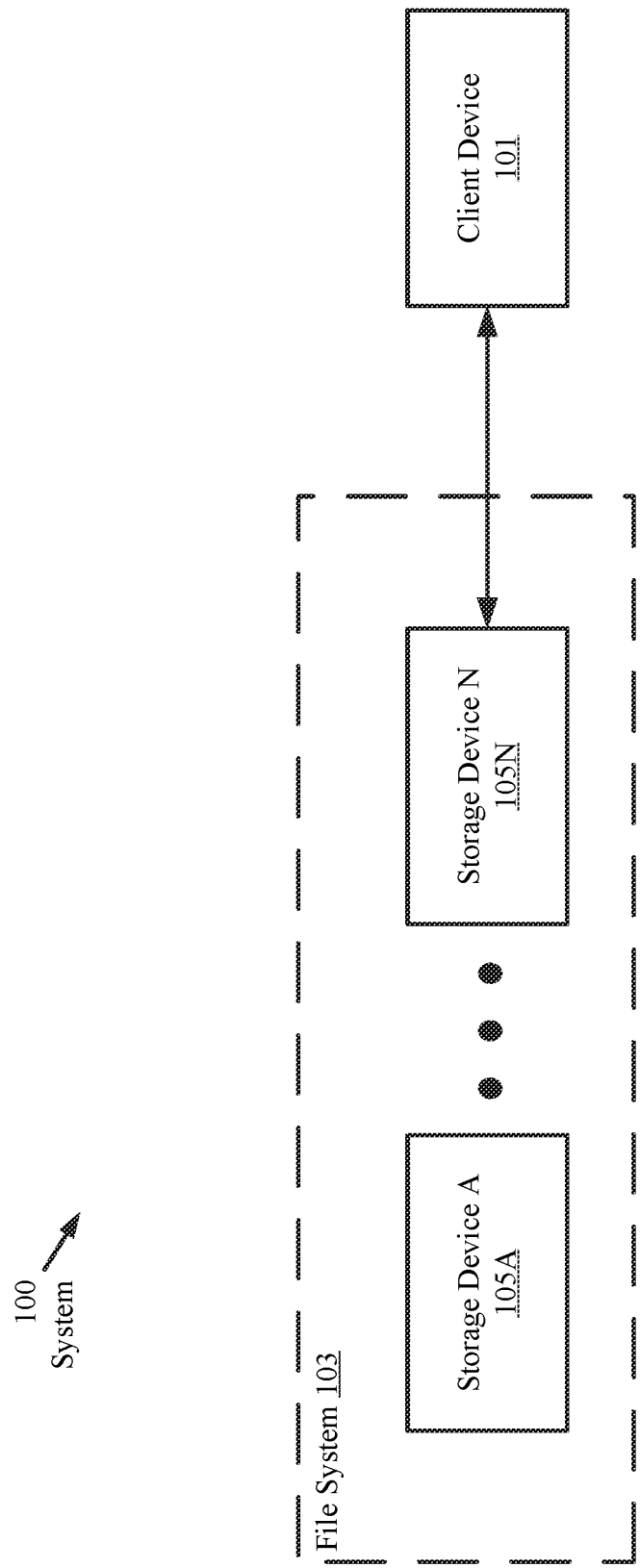
FIG. 1.1

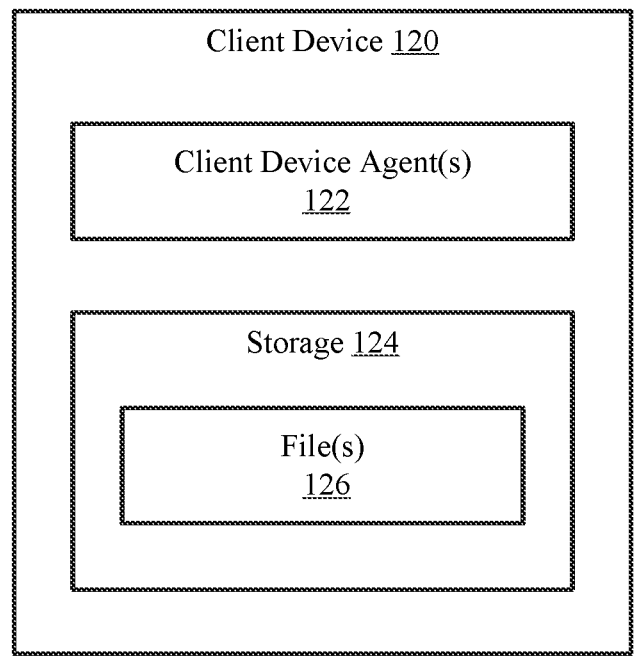
FIG. 1.2
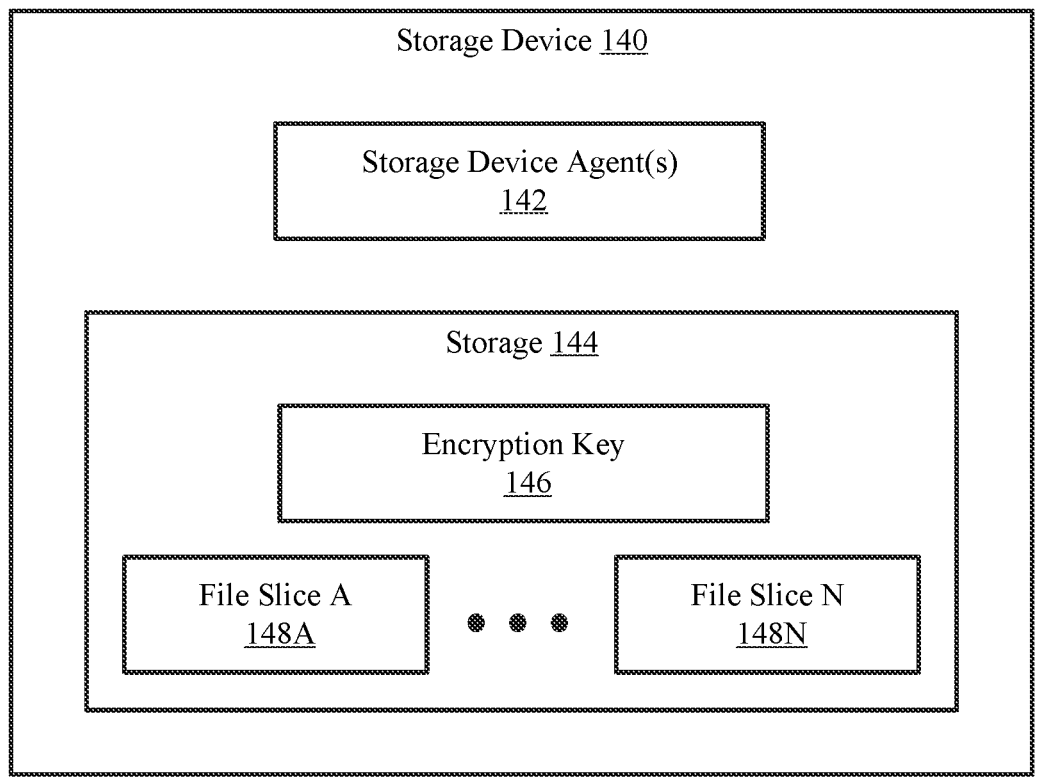
FIG. 1.3

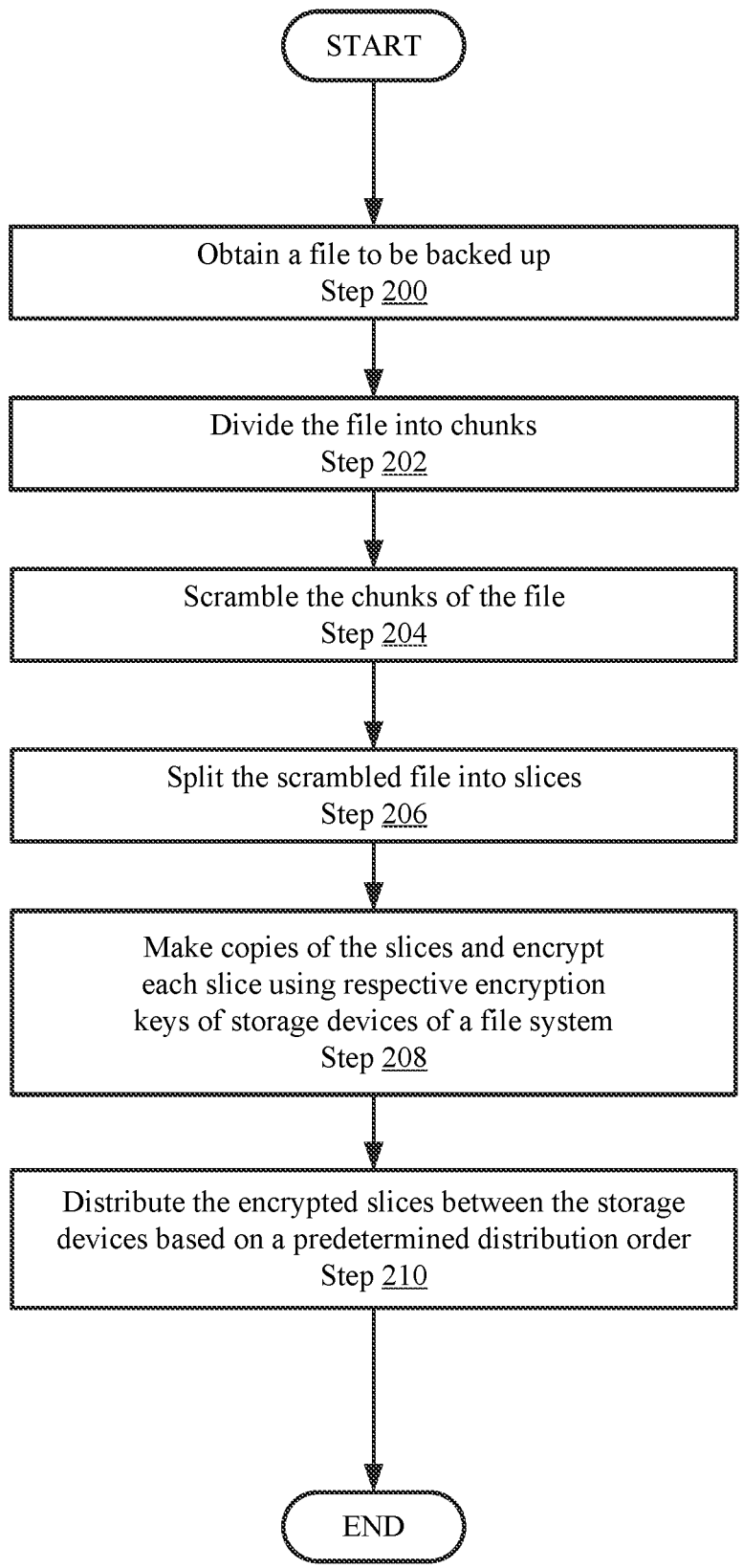
FIG. 2.1

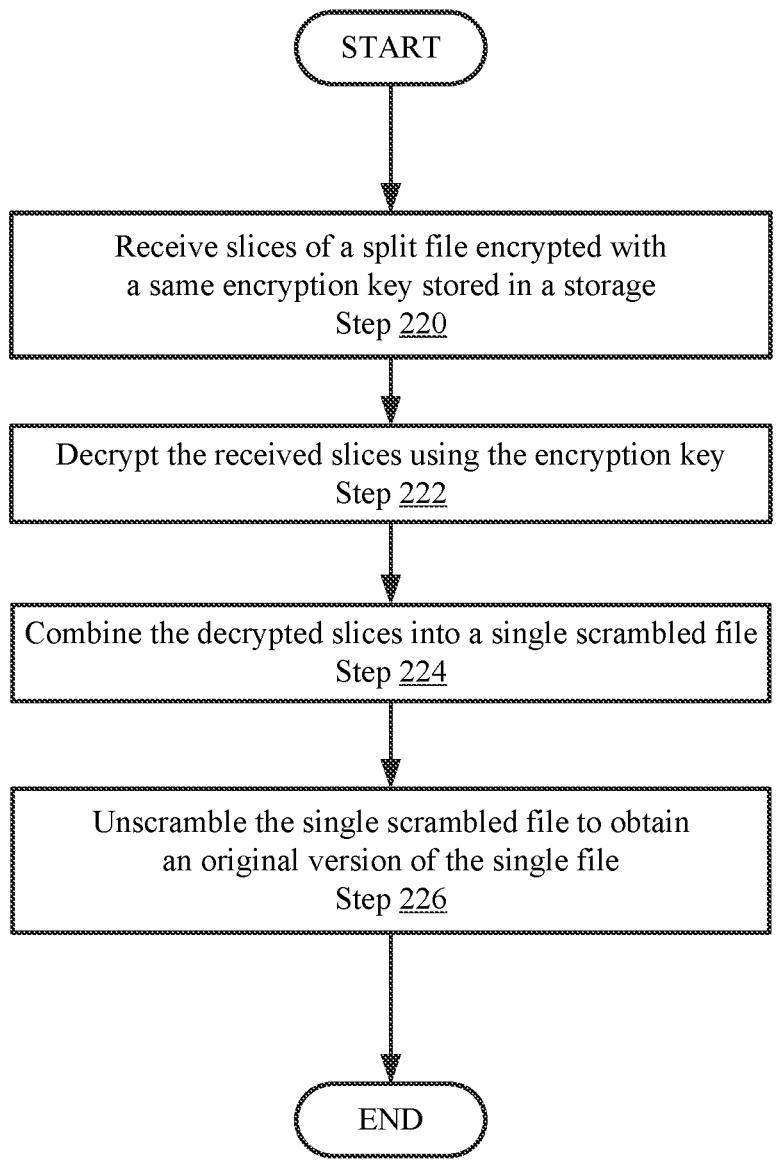
FIG. 2.2

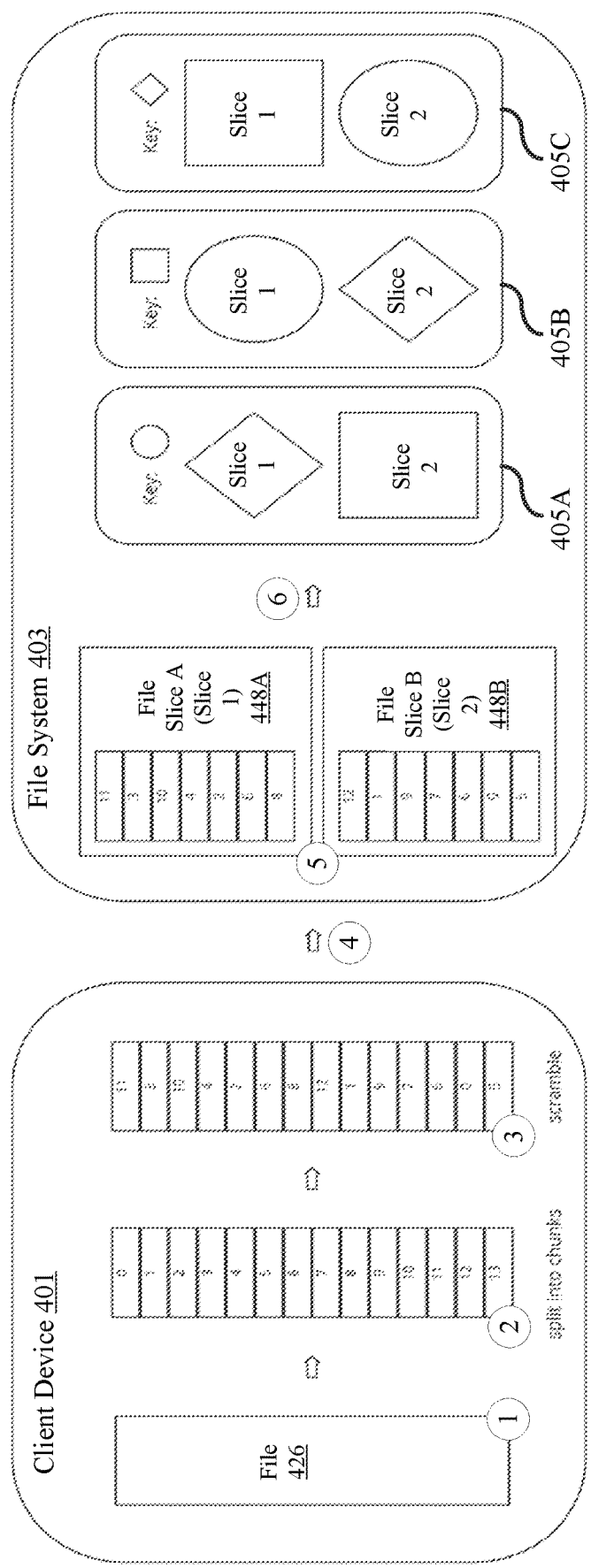
FIG. 4.1

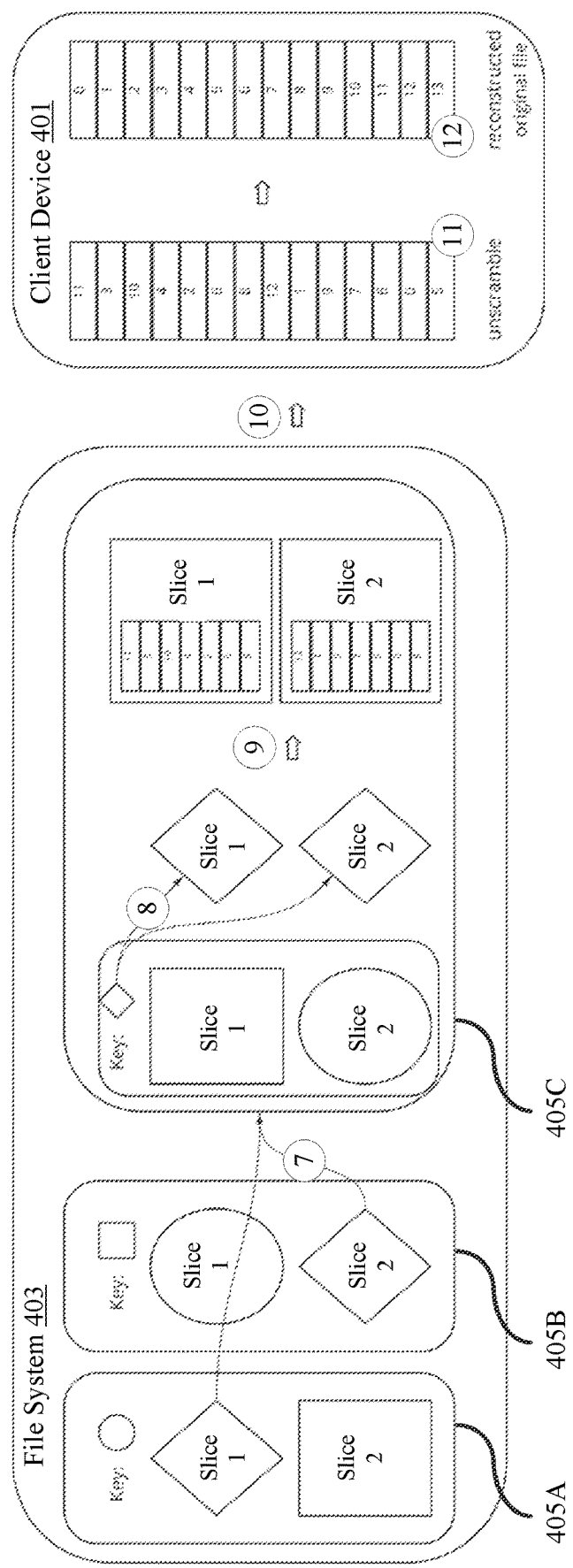
FIG. 4.2

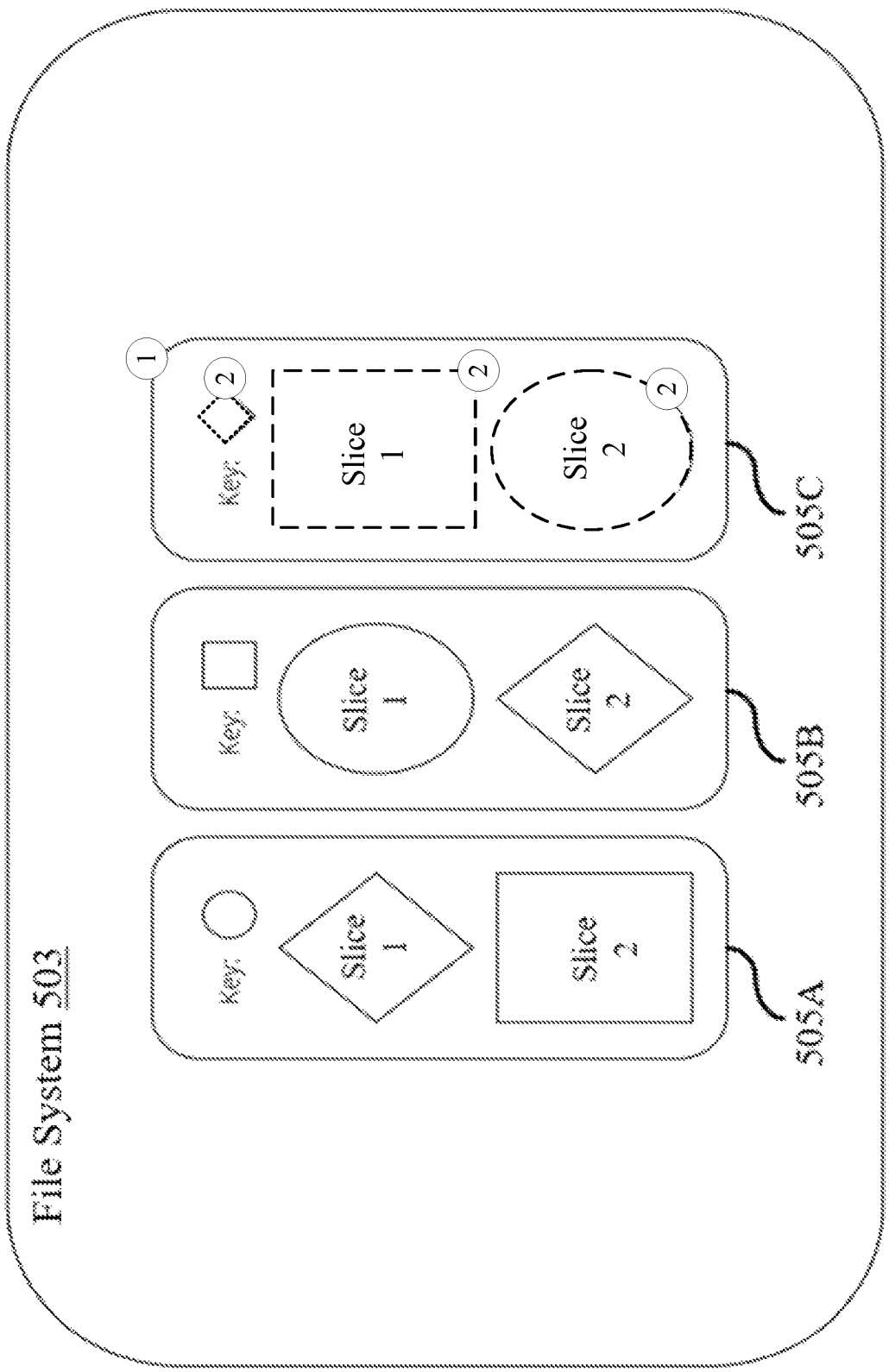
FIG. 5.1

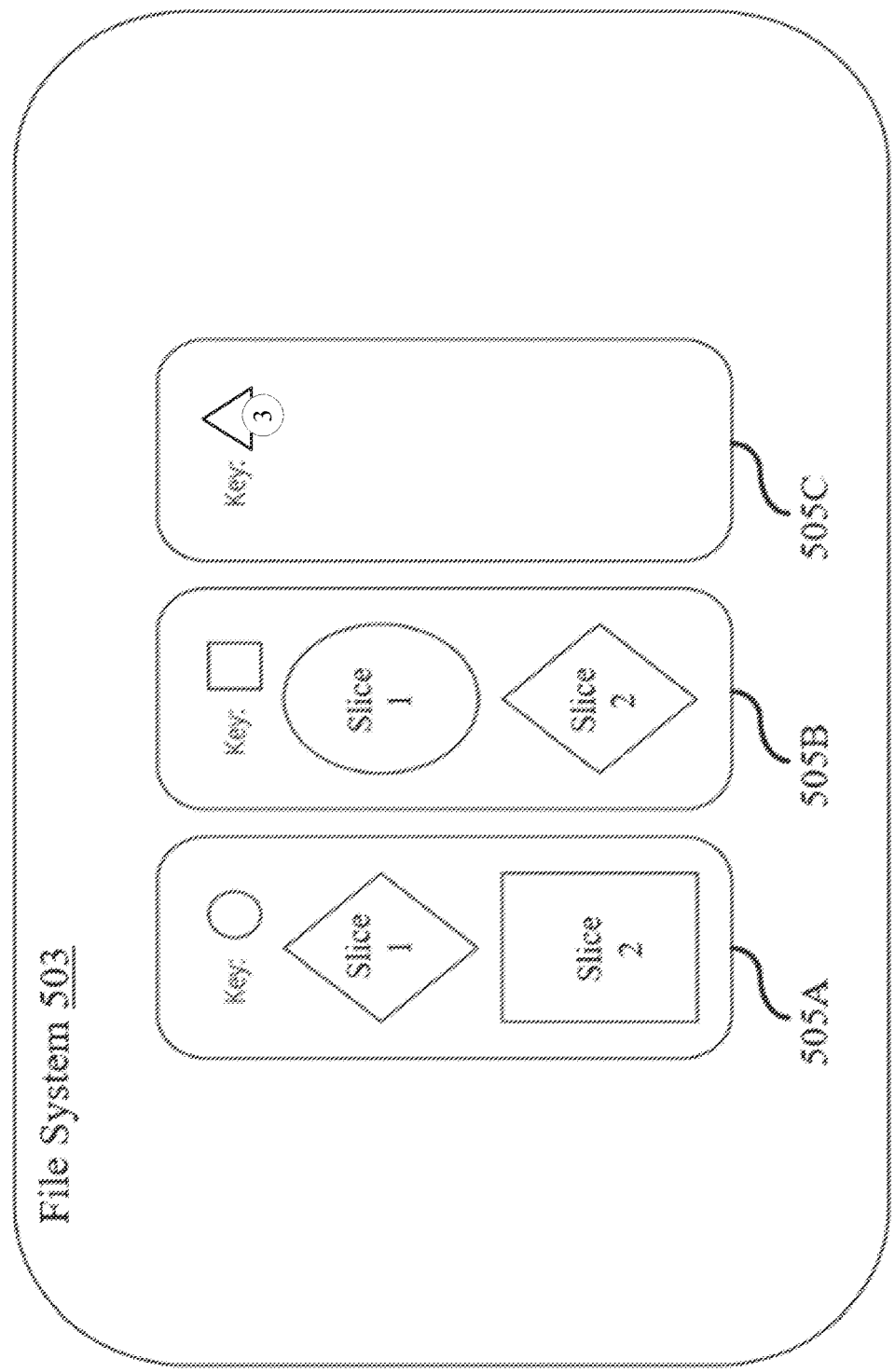
FIG. 5.2

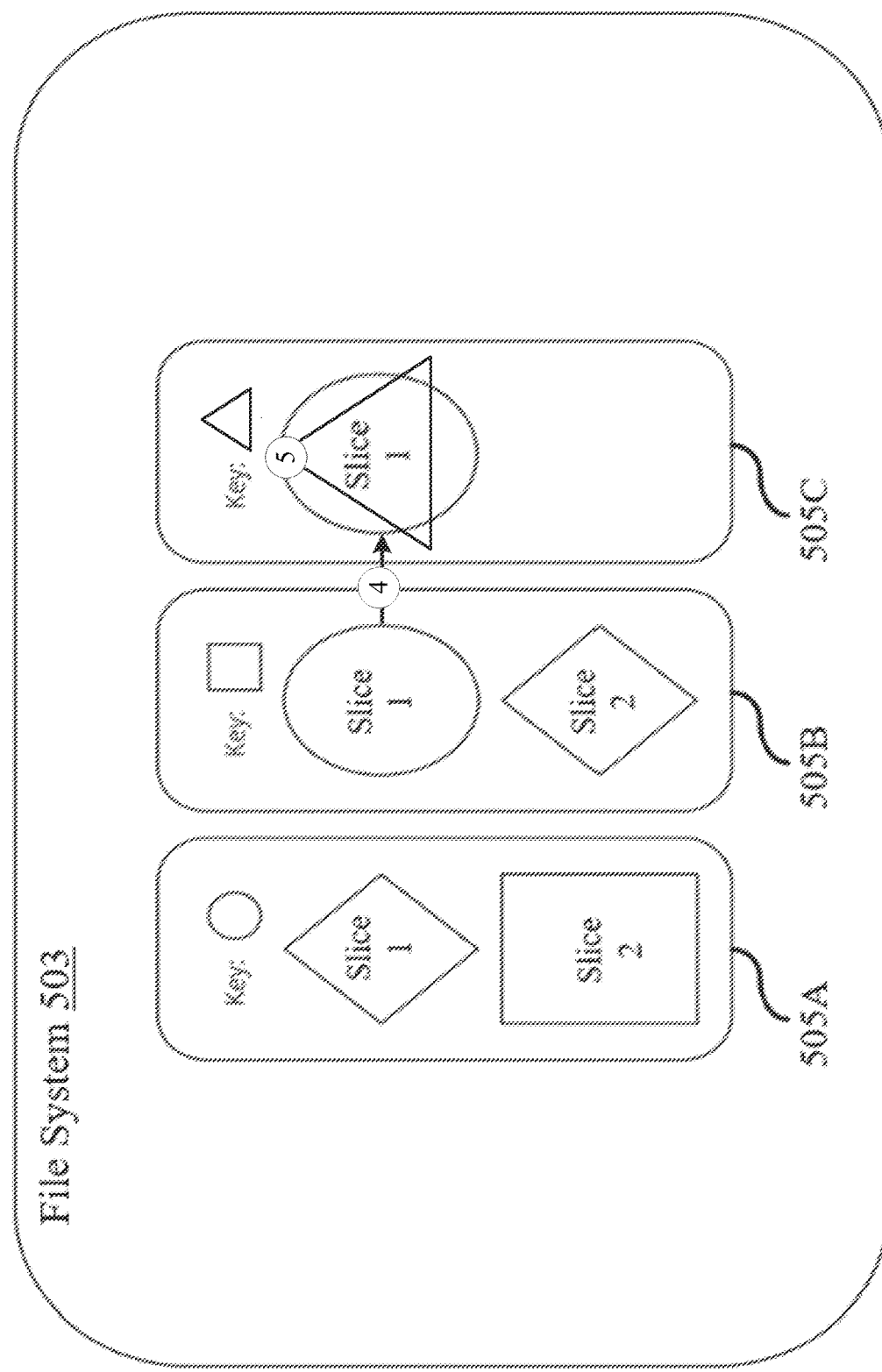
FIG. 5.3

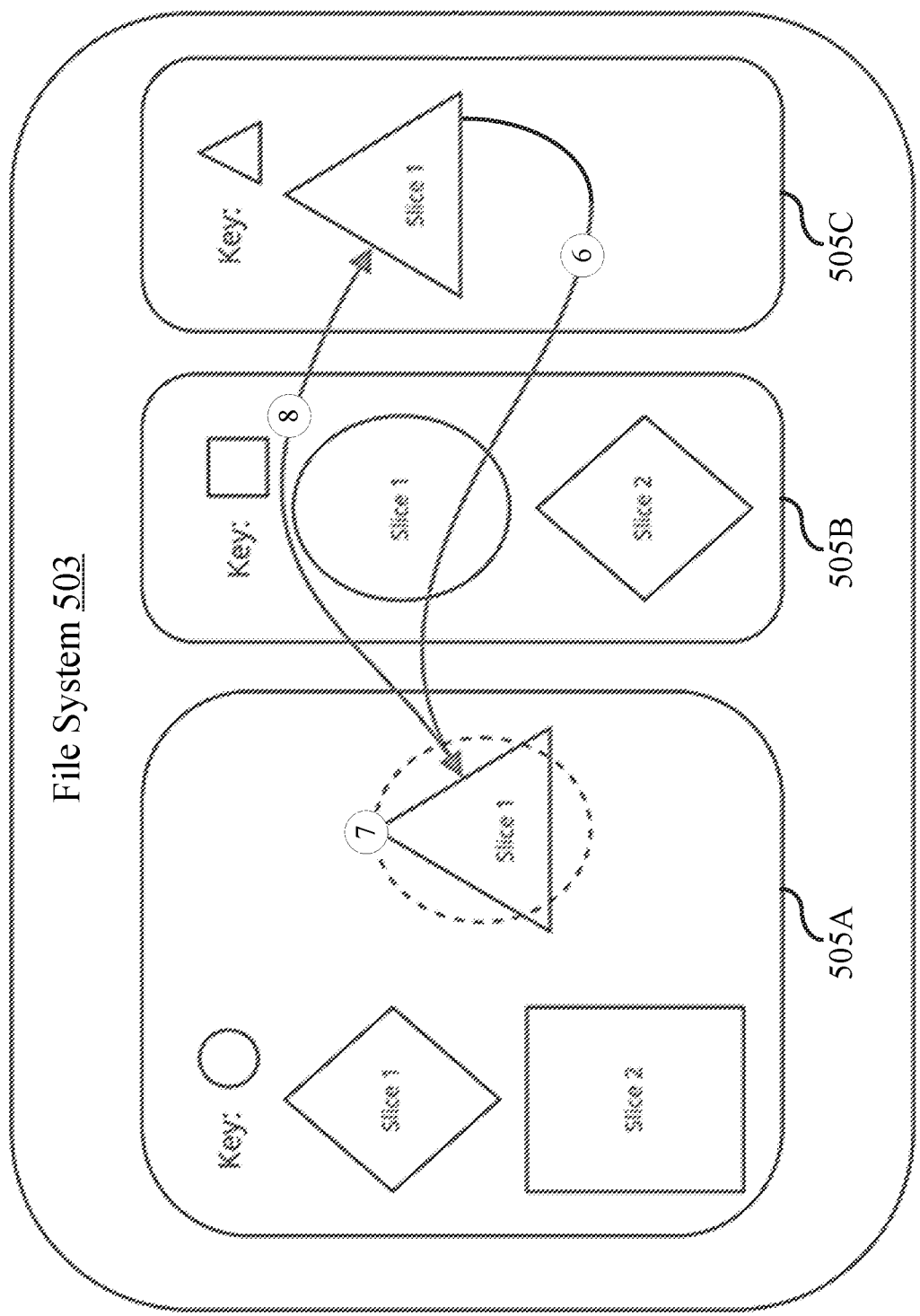
FIG. 5.4

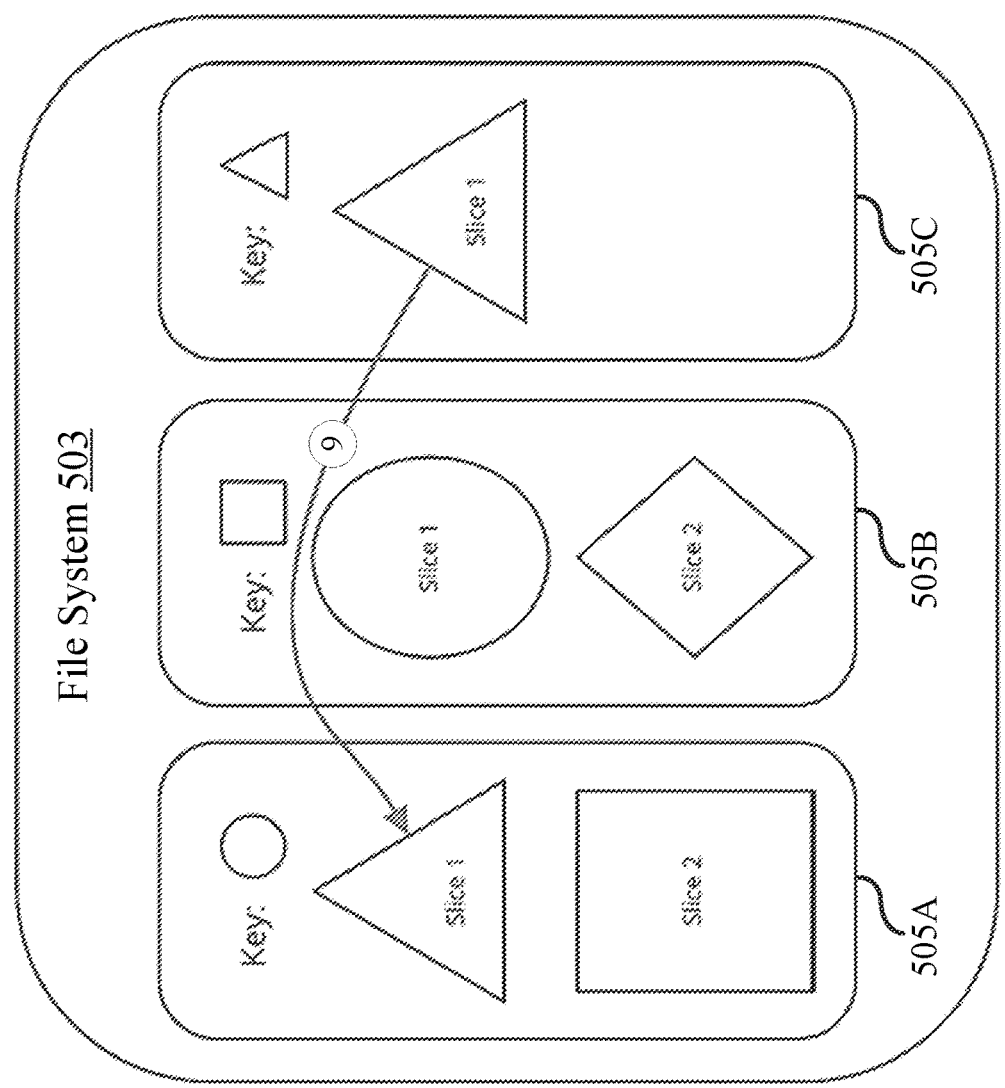
FIG. 5.5

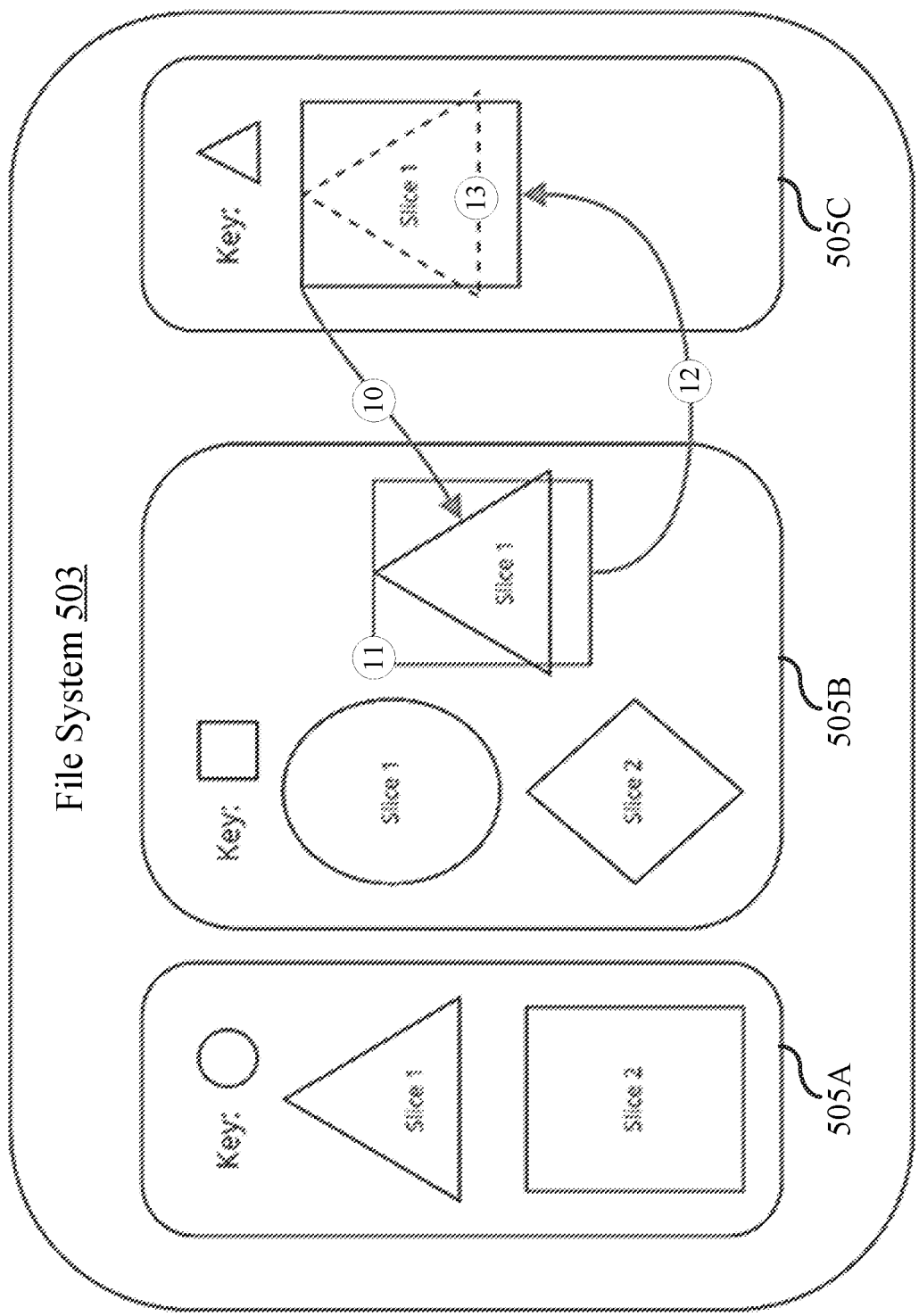
FIG. 5.6

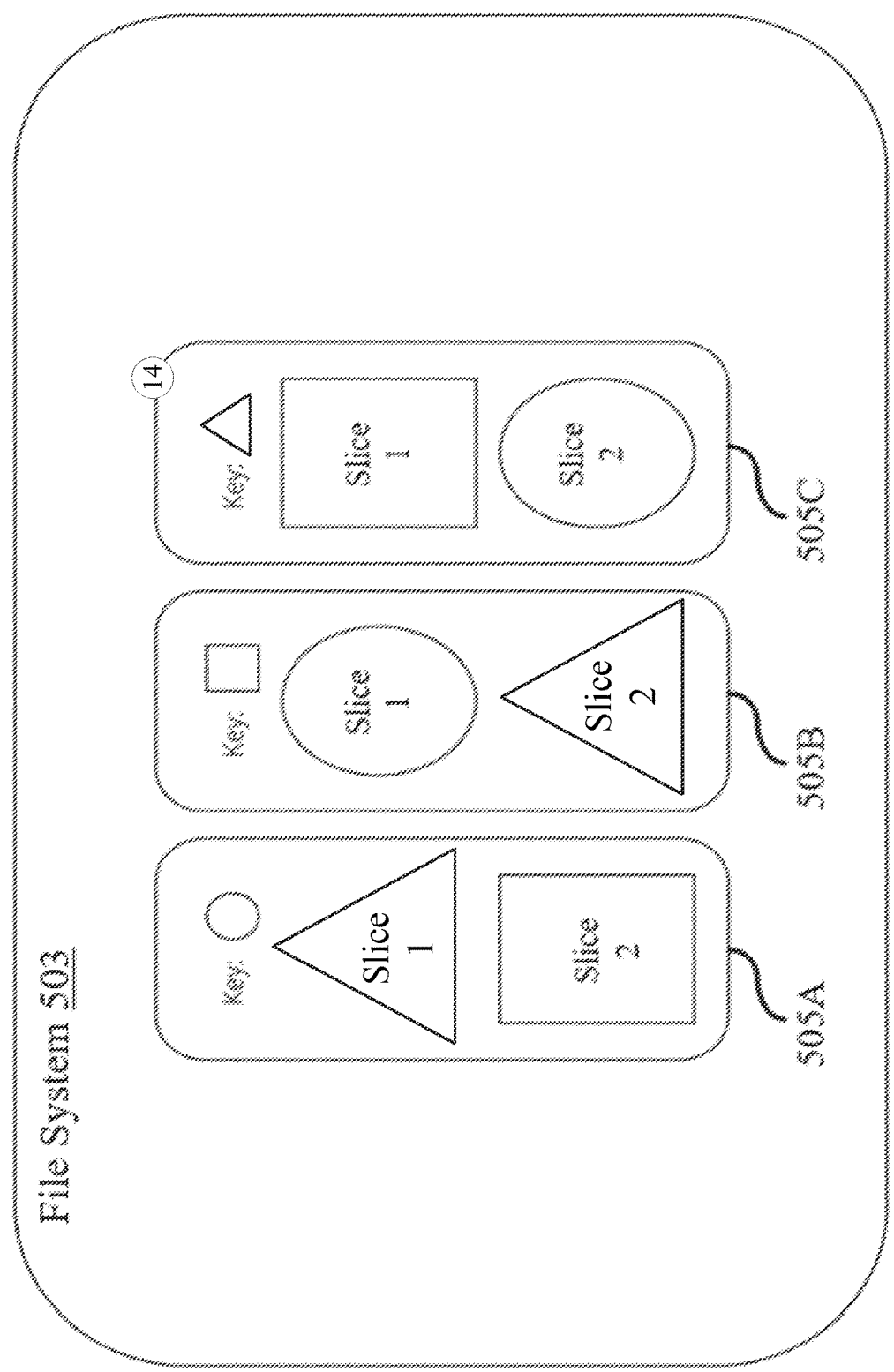
FIG. 5.7

SYSTEM AND METHOD FOR FILE RECOVERY FROM MALICIOUS ATTACKS

BACKGROUND

Computing devices may be used to store data (e.g., files). However, computing devices are susceptible to malicious attacks by others (e.g., ransomware attacks, hacking, etc.). Consequently, users may wish to have access to better ways to protect and restore data when one or more of the users' computing devices are exposed to such malicious attacks.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a system in accordance with one or more embodiments.

FIG. 1.2 shows a diagram of an example client device in accordance with one or more embodiments.

FIG. 1.3 shows a diagram of an example storage device in accordance with one or more embodiments.

FIG. 2.1 shows a flowchart in accordance with one or more embodiments.

FIG. 2.2 shows a flowchart in accordance with one or more embodiments.

FIGS. 4.1 and 4.2 show an implementation example in accordance with one or more embodiments.

FIGS. 5.1-5.7 show an implementation example in accordance with one or more embodiments.

DETAILED DESCRIPTION

Figure 3:
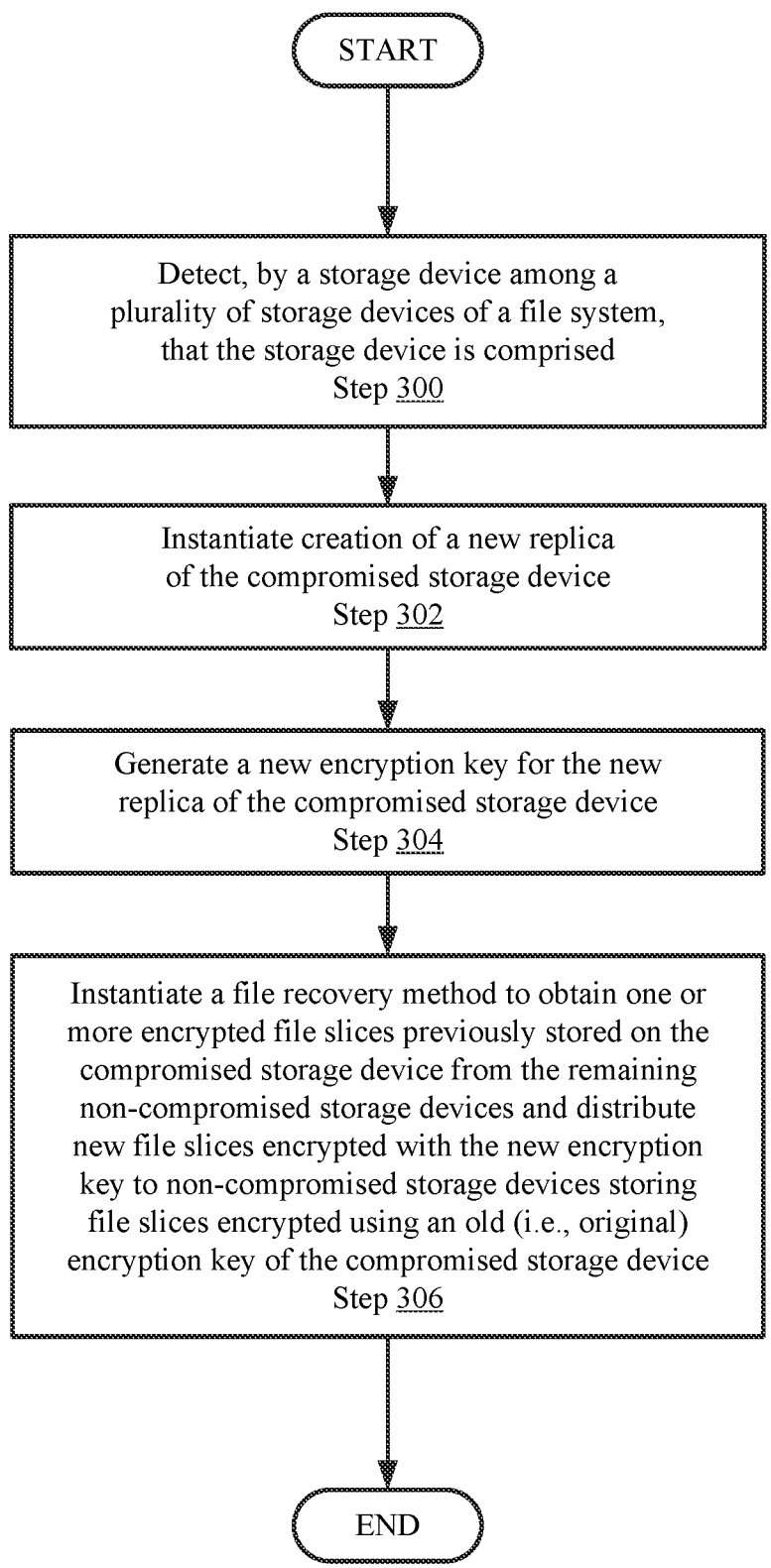
FIG. 3 shows a flowchart in accordance with one or more embodiments.

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

One or more embodiments disclosed herein are directed to systems and methods for a file recovery process. The file recovery process may be executed in view of, for example and is not limited to, a ransomware attack on one or more computing devices. In particular, in one or more embodiments, a file may be scrambled and split into multiple pieces (also referred to herein as "slices"). Copies of each slice of the file may be encrypted and stored one or more storage devices of a file system that does not have the encryption key that can be used to decrypt the encrypted slice. Compromised ones of the storage devices (i.e., storage devices exposed to one or more malicious attacks) may then use the copies stored on non-compromised ones of the storage devices to restore its copies of the file slices.

More specifically, in one or more embodiments, a file system replicated on c number of machines (e.g., storage devices discussed below) may be implemented. Each machine in the file system may have a symmetric encryption key that it does not share with any other machine. Each piece of data stored on the machines may first be scrambled according to a mapping, and then split into c−1 pieces. Each piece may then be replicated c times and encrypted with a different one of the c keys that exist in the file system. The encrypted pieces may then be distributed (e.g., using a predetermined distribution method) across the machines such that each machine has a complete (and encrypted) copy of the data, each piece of which has been encrypted with a different key, none of which is the key of the machine on which the pieces reside. In this way, there are advantageously c full copies of the data at any given time. This advantageously creates a situation where there is no way for an attacker whom has gained access to one of the machines to obtain a scrambled plain-text version of any piece of the data.

Additionally, using the above configuration, the file system can advantageously recover from multiple machines being compromised so long as there are a majority (i.e., strictly greater than c/2) of uncompromised (or non-compromised) machines.

Various embodiments discussed above are now described in more detail below. Other advantages of one or more embodiments disclosed herein will become apparent based on these details.

FIG. 1.1 shows a system (100) in accordance with one or more embodiments. The system (100) includes: a client device (101); and a file system (103) comprising one or more storage devices (105A, 105N). Each of these components of the system will be described in more detail below.

Figure 6:
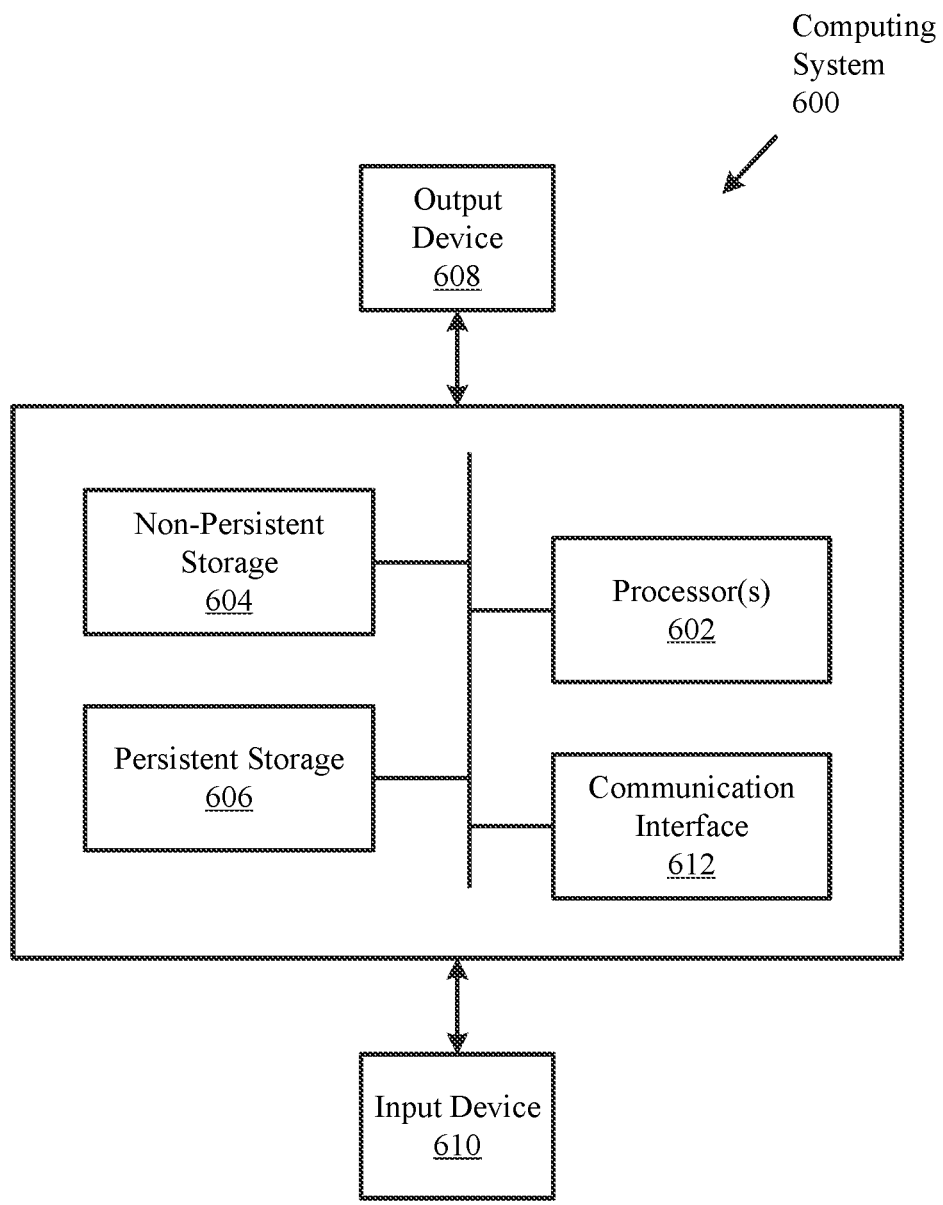
FIG. 6 shows a computer system in accordance to one or more embodiments.

In one or more embodiments disclosed herein, the client device (101) may be a physical device (e.g., a computing device with at least one or more processor(s), memory, and an operating system such as the computing system (600) of FIG. 6) or a virtual device (e.g., a virtual machine executing on one or more physical devices) configure to store data. Examples of the client device may be, but are not limited to: a desktop computer; a laptop computer; a tablet computer; etc.

In one or more embodiments disclosed herein, the file system (103) may be a collection of physical and/or virtual devices used to store one or more copies of a user's (e.g., the client's) data. In one or more embodiments, the file system (103) may be a local file system (103) implemented on one or more computing devices at the client's physical location. Alternatively, the file system (103) may be a remote file system (103) implemented on a network (not shown).

In one or more embodiments, the file system (103) includes one or more storage devices (105A, 105N). Similar to the client device (101), each storage device (105A) may be a physical device (e.g., a computing device with at least one or more processor(s), memory, and an operating system such as the computing system (600) of FIG. 6) or a virtual device (e.g., a virtual machine executing on one or more physical devices) configure to store data. Examples of the client device may be, but are not limited to: a server computer; a desktop computer; a laptop computer; a tablet computer; etc.

One or more embodiments disclosed herein is configured to be implemented on a set of at least three of the storage devices (105A, 105N). Whether each of these three storage devices (105A, 105N) are physical or virtual is inconsequential to one or more embodiments disclosed herein. Each of these at least three storage devices (105A, 105N) may be configured to execute an application for encrypting, storing, and retrieving data (e.g., files). The application may also interface with detection software (e.g., ransomware detection software) so that the application can automatically start a file recovery process in the case where a storage device (105A) is exposed to one or more malicious attacks (e.g., a ransomware attack).

In one or more embodiments, each of the at least three storage devices (105A, 105N) may also be assigned a unique index (e.g., number) that serves as an identification (ID) for each of the storage devices (150A, 105N). This unique index may be used (as discussed below in FIG. 2.1) for the distribution of slices of a file (also referred to herein as "slices" or "file slices") between the at least three storage devices (105A, 105N).

For example, the at least three storage devices (105A, 105N) may be organized in a ring (e.g., a data structure with a fixed size that functions as an array, but acts circular rather than linear). In a ring configuration, the index negative one (−1) is legal, and returns the "last" element in the ring. Similarly, the index 8 in a ring size of 5 would point to a storage device with index three (3). More specifically, for any given index j, its position in the ring i may be calculated as $i = j \pmod{c}$ where c is the total size of the ring (e.g., c is the total number of storage devices (105A, 105N) in the file system).

Additional details of each of the client device (101) and the storage devices (105A, 105N) are discussed below in FIGS. 1.2-1.3, respectively.

Turning now to FIG. 1.2, FIG. 1.2 shows an example client device (120) in accordance with one or more embodiments of this disclosure. The client (120) may be the same as the client device (101) described above in FIG. 1.1. In addition to the components discussed above in reference to FIG. 1.1, the client device (120) further includes: one or more client device agents (122); and a storage (124) storing one or more files (126). Each of the components illustrated in FIG. 1.2 is described below.

In one or more embodiments disclosed herein, the client device agent(s) (122) may be configured in hardware (e.g., circuitry), software, or any combination thereof. The client device agent(s) (122) interact with the other components of the client device (120) to facilitate the implementation of one or more protocols, services, and/or features of the network device. For example, the client device agent(s) (122) may be used for performing one or more steps of processes in accordance with various embodiments of the disclosure (e.g., the processes discussed below in FIGS. 2.1-2.2). By way of example, the client device agent(s) (122) may be one or more application programming interfaces (APIs) executing on the client device (120).

In one or more embodiments disclosed herein, the storage (124) is implemented using devices that provide data storage services (e.g., storing data and providing copies of previously stored data). For example, storage (124) may include any quantity and/or combination of memory devices (i.e., volatile storage), longer term storage devices (i.e., persistent storage), other types of hardware devices that may provide short term and/or long term data storage services, and/or logical storage devices (e.g., virtual persistent storage/virtual volatile storage).

In one or more embodiments, the storage (124) may store data including, as an example, one or more files (126). Each file may be stored in any format and in any size. Each file may also contain any type of data (e.g., sensitive data, non-sensitive data, etc.).

Turning now to FIG. 1.3, FIG. 1.3 shows an example storage device (140) in accordance with one or more embodiments of this disclosure. The storage device (140) may be the same as any one of the storage devices (105A, 105N) described above in FIG. 1.1. In addition to the components discussed above in reference to FIG. 1.1, the storage device (140) further includes: one or more storage device agents (142) and a storage (144) storing an encryption key (146) and one or more file slices (148A, 148N). Each of the components illustrated in FIG. 1.3 is described below.

In one or more embodiments disclosed herein, the storage device agent(s) (142) may be configured in hardware (e.g., circuitry), software, or any combination thereof. The storage device agent(s) (142) interact with the other components of the storage device (140) to facilitate the implementation of one or more protocols, services, and/or features of the network device. For example, the storage device agent(s) (142) may be used for performing one or more steps of processes in accordance with various embodiments of the disclosure (e.g., the processes discussed below in FIGS. 2.1, 2.2, and 3). By way of example, the storage device agent(s) (142) may be one or more application programming interfaces (APIs) executing on the storage device (140).

In one or more embodiments disclosed herein, the storage (144) is implemented using devices that provide data storage services (e.g., storing data and providing copies of previously stored data). For example, storage (144) may include any quantity and/or combination of memory devices (i.e., volatile storage), longer term storage devices (i.e., persistent storage), other types of hardware devices that may provide short term and/or long term data storage services, and/or logical storage devices (e.g., virtual persistent storage/virtual volatile storage).

In one or more embodiments disclosed herein, the storage (144) of the storage device (140) is configured to store the encryption key (146) and the one or more file slices (148A, 148N). In one or more embodiments, the encryption key (146) may be created in any form (e.g., random string of bits created explicitly for scrambling and unscrambling data) based on one or more set of rules set by a user (e.g., a user of the client device (120), an administrator of the file system (103) of FIG. 1.1, etc.). In one or more embodiments, a commutative encryption process (which will be discussed in more detail below) may be implemented using the encryption key (146). Additionally each encryption key (146) stored in each storage device (140) may be different from one another.

In one or more embodiments, the one or more file slices (148A, 148N) may be pieces (i.e., slices) of a whole file (e.g., file (126) stored in the client device (120)). Each file slice (148A, 148N) may be in a same or different format of the original file from which it is divided (or split). Each file slice (148A, 148N) may also be in any size based on how the original file was divided (or split).

One skilled in the art will recognize that the architecture of the system (100), the client device (120), and the storage device (140) is not limited to the components shown in FIGS. 1.1 to 1.3, respectively. For example, the system (100) may include a network (not shown) connecting the client device (101) to the file system (103). Further, the client device (120) and the storage device (140) may include components (e.g., a processor) not shown in FIGS. 1.2 and 1.3, respectively. Accordingly, embodiments disclosed herein should not be limited to the devices and/or components shown in FIGS. 1.1-1.3.

Turning now to FIGS. 2.1 and 2.2, FIGS. 2.1 and 2.2 show methods for storing and retrieving, respectively, a file from the client device (e.g., 101, FIG. 1.1; 120, FIG. 1.2) (or from any one of the storage devices) to the file system (e.g., 103, FIG. 1.1).

More specifically, starting with FIG. 2.1, FIG. 2.1 shows a method for storing a file from a source device (e.g., the client device or any one of the storage devices) to the storage devices of the file system. The method shown in FIG. 2.1 may be performed by, for example, by the client device or any one of the one or more storage devices. Other components of the FIG. 1.1 may perform the method shown in FIG. 2.1 without departing from the scope of one or more embodiments disclosed herein.

Additionally, while FIG. 2.1 is illustrated as a series of steps, any of the steps may be omitted, performed in a different order, additional steps may be included, and/or any or all of the steps may be performed in a parallel and/or partially overlapping manner without departing from the invention.

Starting with Step 200, a file (e.g., 126, FIG. 1.2) to be backed up may be obtained. The file may be obtained from any source by a user (whom may or may not be the original owner of the file), and may contain any type of data (e.g., sensitive data, non-sensitive data, etc.).

As a non-limiting example of one or more embodiments disclosed herein, regardless of an interface between the user of file and the file system, when a user wishes to store a file to the file system, the user may first have to authenticate himself or herself via a single-sign on (SSO) or any other equivalent mechanism. Once the user is authenticated, the file system may create a record of the file that will be stored in the system. This record may include information about the file including but is not limited to: the file's full path, the size of the file in bytes; the chunk size of each chunk of the file (discussed below in the next steps of FIG. 2.1); the size of each slice that the file will be divided into (also discussed below in the next steps of FIG. 2.1); etc.

In Step 202, the file is divided into one or more chunks. Each chunk of the file may be a chunk size-byte slice of the file. Each chunk may be the same or different in size as the other chunks. An example of the chunks is shown in more detail below in FIG. 4.1.

In Step 204, the chunks of the file are scrambled. For example, in one or more embodiments, the file may be scrambled according to a generated mapping of bytes. In particular, the mapping may be generated by first hashing the file's path concatenated with a global passphrase set by the user. The bytes may then be provided as a seed to a pseudorandom number generator. A list of indices of file chunks may then be created. The list of indices may be shuffled using the pseudorandom generator to create a mapping of the chunks. This advantageously achieves a reproducible, file-specific mapping without needing to store each file's mapping individually.

Furthermore, the chunks of the file may then be scrambled using the generated mapping. The scrambled file may then be sent over a secure connection to the file system (in the event the file system is a remote file system) along with a filename of the file and the user's SSO token. In one or more embodiments, although the filename may be used in the above-discussed hashing process that provided the file chunk mapping, the use of the global passphrase advantageously prevents attackers from unscrambling the file because the global passphrase may be configured to never leave the user's machine (e.g., the client device).

Although a specific example is provided above for scrambling the chunks of the file, one of ordinary skill in the art would appreciate that any other methods that can securely scramble chunks of a divided file may also be used without departing from the scope of one or more embodiments disclosed herein.

In Step 206, the scrambled file is split into one or more slices. For example, as a non-limited example of one or more embodiments, the file may be split into c−1 slices where c is a total number of storage devices that the file will be stored across. More specifically, assume that the file will be split across three (3) storage devices. In this case example, c−1 equals 2, so the scrambled file will be split into 2 slices. Each slice of the file may have the same size. Alternatively, each slice of the file may have a different size.

In Step 208, copies of the slices split in Step 206 are made (e.g., by each of the storage devices of the file system) and each copy of each slice may be encrypted using respective encryption keys of the storage devices of the file system.

For example, in one or more embodiments, after Steps 204 and during or after Step 206, the client device may send the scrambled file, the filename of the scrambled file, and the user's SSO token to the c−1 storage devices of the file system. Each storage device may then validate (using the SSO token) that the user is authorized to store the file in a location on the file system specified by the user. Each respective storage device may then encrypt each slice of the split file with its respective encryption key.

In Step 210, the encrypted slices are distributed between the storage devices based on a predetermined distribution order. For example, in one or more embodiments, the distribution may be done in an organized fashion, such that for any slice of a file $f_i$ with index i encrypted with key $k_e$ where e is the index of the encrypting machine (e.g., encrypting storage device), that slice of the file will be stored on the machine whose index is (i+e+1) (mod c). More specifically, assume that the file system includes a 5-machine system (c=5). The second slice of a file $f_1$ encrypted with $k_2$ will be stored on the storage device at index (1+2+1) (mod 5)=4. Similarly, in a 7-machine system, the sixth slice of a file $f_5$ encrypted with a key $k_3$ will be stored on the storage device at index (5+3+1) (mod 7)=2. This structure and distribution order advantageously allows for each storage device to know which other storage device(s) holds which slices that have been encrypted with a given storage devices encryption key.

One of ordinary skill in the art would appreciate that other distribution method may also be used without departing from the scope of one or more embodiments disclosed herein as long as each component (e.g., storage device) of the file system is aware of the location (e.g., storage location) of each encrypted slice of the file within the file system.

Based on the above-discussed scrambling and distribution method of FIG. 2.1, an attacker will not be able to easily gain access to the unscrambled file. More specifically, if an attacker does manage to gain access to a, a>1 storage devices in the file system, they will only be able to obtain the scrambled plain-text of a/c−1 portions of the files to which they have the encryption key(s). Thus, as discussed above, scrambling the files using the global passphrase advantageously prevents attackers from unscrambling the file in the event that the attackers gain access to multiple storage devices, which is a fairly unlikely event to happen. Such scrambling of the file is also advantageous because it would be difficult for the attackers to gain access to the global passphrase that is stored in a different location.

An implementation example of the above-discussed file storing process of FIG. 2.1 is shown with more detail below in reference to FIG. 4.1.

Turning now to FIG. 2.2, FIG. 2.2 shows a method for retrieving a file from the storage devices of the file system. The method shown in FIG. 2.2 may be performed by, for example, any one of the one or more storage devices in combination with the client device. Other components of the FIG. 1.1 may perform the method shown in FIG. 2.2 without departing from the scope of one or more embodiments disclosed herein.

Additionally, while FIG. 2.2 is illustrated as a series of steps, any of the steps may be omitted, performed in a different order, additional steps may be included, and/or any or all of the steps may be performed in a parallel and/or partially overlapping manner without departing from the invention.

Starting with Step 220, one of the storage devices may receive slices of a split file encrypted with a same encryption key that it is storing in its storage. In one or more embodiments, this storage device may have previously received a file retrieval request from a user (e.g., via the client device). Upon receiving the file retrieval request, the storage device may transmit requests to the other storage devices to retrieve the file slices that are encrypted using its encryption key.

In Step 222, the storage device decrypts the encrypted file slices using its encryption key. Once decrypted, the storage device may transmit the decrypted file slices to the client device where the decrypted file slices are combined into a single file (e.g., a single scrambled file) in Step 224.

In Step 226, the single scrambled file may be unscrambled to obtain an original version of the single file (e.g., the original file obtained in Step 200 of FIG. 2.1). For example, because the user knows the actual name (e.g., filename) of the file in addition to the global passphrase used to scramble the file, the user would be able to recreate the hash that was generated to obtain the files chunk mapping. Using the mapping, the user is then able to unscramble the file and successfully retrieve the data stored in the file.

Additionally, using the filename and the global passphrase, the user is not bound to any one of the storage devices should the user need to access files from multiple ones of the storage devices (or lose access to the initial storage device to which the initial file retrieval request was sent).

An implementation example of the above-discussed file retrieval process of FIG. 2.2 is shown with more detail below in reference to FIG. 4.1.

Turning now to FIG. 3, FIG. 3 shows a file recovery method executed in response to one or more of the storage devices of the file system being exposed to a malicious attack. The method shown in FIG. 3 may be performed by, for example, any one of the one or more storage devices of the file system. Other components of the FIG. 1.1 may perform the method shown in FIG. 3 without departing from the scope of one or more embodiments disclosed herein.

Additionally, while FIG. 3 is illustrated as a series of steps, any of the steps may be omitted, performed in a different order, additional steps may be included, and/or any or all of the steps may be performed in a parallel and/or partially overlapping manner without departing from the invention.

Initially, in Step 300, a storage device among the storage devices of the file system detects that the storage device is compromised due to being exposed to a malicious attack. For example, the storage device may be comprised due to being subjected to a ransomware attack and knows that it has been compromised. One of ordinary skill in the art would appreciate that any type of malicious attack detection method/process may be employed without departing from the scope of one or more embodiments as long as the storage device is able to detect (i.e., determine) that it has been compromised.

Additionally, detection of other faults that are not related to malicious attacks may also be done in Step 300 without departing from the scope of one or more embodiments. For example, a storage device could also be considered compromised if it detects other types of faults such as, but not limited to: a sudden crashing and disconnection from the file system, etc.

In Step 302, upon detecting that it has been compromised, the compromised storage device may instantiate creation of a new replica of the compromised storage device. For example, in one or more embodiments, the compromised storage device may instantiate the creation of the new replica on an available, unused storage device of the file system.

Alternatively, the compromised storage device may also be used as the new replica so long as the compromised storage device has been reset and re-secured through automated or manual means. More specifically, as part of the reset and re-securing procedure, the compromised storage device may delete (e.g., purge, re-format, etc.) all of the data stored in its storage including an original encryption key associated with the compromised storage device and all of the encrypted file slices stored in the compromised storage device.

In Step 304, the new replica of the compromised storage device generates a new encryption key to be associated with the new replica. The new encryption key of the new replica is different from the original encryption key of the compromised storage device.

In one or more embodiments, in the event that the new replica is instantiated on an available, unused storage device of the file system, the new replica alerts (e.g., transmits a notice) to the compromised storage device that it is ready to begin the file recovery method. In response to receiving the alert(s), the compromised storage device may transmit information specifying the structure of the file system (e.g., including directory and filenames) to the new replica. Also transmitted to the new replica may be information specifying: the new replica's index in the ring r, and the internet protocol (IP) addresses and indices of the existing c−1 machines (which may include a list of all known compromised machines).

In Step 306, the new replica instantiates a file recovery method to obtain one or more encrypted file slices previously stored on the compromised storage device from the remaining non-compromised storage devices, and distributes new file slices encrypted with the new encryption key to non-compromised storage devices storing file slices encrypted with the old (i.e., original) encryption key of the compromised storage device.

More specifically, in one or more embodiments, the new replica of the compromised storage device (whether it be a new unused storage device or the re-secured compromised storage device) must work with the rest of the storage devices in the file system to recover the slices of files in the compromised storage device that are no longer accessible.

A non-limiting example of the above discussed file recovery method will now be described below. One of ordinary skill in the art would appreciate that other methods may be used and that the below-discussed file cover method example should not be used to limit the scope of one or more embodiments disclosed herein.

Beginning of Non-Limiting Example of File Recovery Method.

Initially, the file as stored in the file system is comprised of c−1 pieces, each with an index in the range 0<=i<c−1. As discussed above, $f_i$ is defined as the piece of the file f at index i. As also discussed above, each piece of the file $f_i$ in the system is encrypted with a key $k_j$, where j is the index of the storage device ($M_j$) that stored $k_j$. The notation $k_j f_i$ may then be used to show that $f_i$ is encrypted with $k_j$.

Additionally, chosen and calculated indices of the storage devices that are necessary for the file recovery process for a given file $f_i$ may be defined. For example, the compromised storage device and is being recovered may be defined as $M_r$. In one or more embodiments, earlier-defined (e.g., pre-defined) indices in the ring of storage devices will not change (e.g., the new replica will slot into a spot vacated by the compromised storage device).

To recover a slice $f_i$, a usable copy (encrypted with a key $k_j$ such that $M_j$ is not compromised) may be obtained from an available, non-compromised storage device. The source storage device of the useable $f_i$ is defined as $M_s$, where s is not pre-determined or calculated (e.g., any $M_s$ with a usable $f_i$ will be sufficient).

The usable $f_i$ will be encrypted with $k_e$. Although s is chosen such that it has a usable $f_i$, e is dependent on s due to a shortage scheme as a result of the above-discussed ring configuration. In one or more embodiments, e may be calculated through the following equation of e=(s−(i+1)) (mod c), which is the inverse of the above-discussed example distribution equation of (i+e+1 (mod c).

Once s and e are known, $k_e f_i$ may first be sent from $M_s$ to $M_r$, where $k_e f_i$ is further encrypted with $k_r$. This is done first so that $f_i$ is never stored in plain-text (e.g., in a non-encrypted form). $M_r$ then sends the twice-encrypted $k_r k_e f_i$ to $M_e$, where it is decrypted once using $k_e$. The twice-encryption is doable because the file system is configured to utilize a commutative encryption method such that the order in which the encryption keys are used to encrypt/decrypt a file slice does not matter. $M_e$ then returns $k_r f_i$ to $M_r$.

At this point, in one or more embodiments, $M_r$ has a copy of the file piece encrypted with its own encryption key, and is therefore able to start the process of replacing the two compromised fi that depend on $M_r$. These $f_i$ are the copies that were stored on $M_r$ and the copies that were encrypted with $k_r$, since all of these copies became unusable once $M_r$ became unusable. For the latter (e.g., the copies that were encrypted with $k_r$), an index a of the storage device(s) $M_a$ that needs $k_r$ replaced may be calculated using the equation of a=(r+(i+1)) (mod c). $M_r$ then checks the list of known compromised storage devices to determine whether $M_a$ is compromised. If $M_a$ is not compromised, $M_r$ sends $k_r f_i$ to $M_a$, which then stores $k_r f_i$ in its respective storage as a replacement for the inaccessible $k_r$.

Finally, in one or more embodiments, the last piece to be replaced is $k_b f_i$ where b is the index of the storage device $M_b$ whose encryption key was used to encrypt $f_i$ for $M_r$. The equation of b=(r−(i+1)) (mod c) may be used to find $M_b$. $M_r$ checks that $M_b$ is not compromised, and if so sends $k_r f_i$ to $M_b$. $M_b$ encrypts the piece with $k_b$ and sends it back to $M_r$. $M_r$ is then able to decrypt $k_b k_r f_i$ with $k_r$ and store the resulting slice in its correct location.

A detailed implementation example of the above-discussed file recovery method implemented in a 3-storage device file system with one (1) compromised storage device is shown below in reference to FIGS. 5.1-5.7.

In one or more embodiments, once the above file recovery method is completed, the file system is restored to a state that it would have been in had $M_r$ not been compromised. Said another way, every piece of the file which depended only on $M_r$ and no other compromised storage devices have been restored.

In one or more embodiments, at the end of the above-discussed file recovery method, $M_r$ is moved out of a list of compromised machines, and the above-discussed file recovery method if repeated for any remaining compromised machines on the list.

In one or more embodiments, during the above-discussed file recovery process, although users may not save files (either new or existing) to the file system until the file system is recovered to its normal state, users will advantageously still be able to retrieve files from the file system. This is because it is known that at least one piece of every file is usable so long as the system is in a recoverable state (e.g., a state where no more than a strict majority of storage devices is compromised).

End of Non-Limiting Example of File Recovery Method.

To further clarify embodiments of the invention, a non-limiting example is provided in FIGS. 4.1 and 4.2. In particular, FIGS. 4.1 and 4.2 respectively shows an example of a file storage process and a file retrieval process. The numbers in the brackets below, e.g., "[1]", correspond to the same circled numbers in FIGS. 4.1 and 4.2.

Beginning of Example

Starting with FIG. 4.1, assume that the system of FIG. 4.1 includes a file system (403) (e.g., 103, FIG. 1.1) with three (3) storage devices A-C (405A, 405B, 405C) (e.g., 105A-105N, FIG. 1.1). As shown in FIG. 4.1, each storage device A-C (405A, 405B, 405C) has its own unique encryption key (e.g., the circle key for storage device A (405A).

Starting off, a file (426) (e.g., 126, FIG. 1.2) obtained by a client device (401) (e.g., 101, FIG. 1) [1]. The file (426) is divided into chunks [2]. The chunks are then scrambled to obtain a scrambled file [3]. The scrambled file is then transmitted from the client device (401) to the file system (403) [4].

The file system (403) receives (via any of the storage devices A-C (405A-405C) the scrambled file and divides the scrambled file into file slice A (448A) ("Slice 1") and file slice B (448B) ("Slice 2") [5]. As seen in FIG. 4.1, Slice 1 and Slice 2 are then replicated, encrypted, and distributed by the storage devices A-C (405A-405C) such that no storage device (405A-405C) is storing a file slice that it is able to decrypt using its own encryption key [6]. This completes the file storing process.

Turning now to FIG. 4.2, at a later point in time after [6], the user may wish to retrieve the file and transmit a file retrieval request to storage device C (405C). In response, storage device C (405C) retrieves Slice 1 and Slice 2 encrypted using its encryption key from storage device A (405A) and storage device B (405B) [7].

Once encrypted Slice 1 and encrypted Slice 2 are received by storage device C (405C), storage device C (405C) decrypts encrypted Slices 1 and 2 using its encryption key (e.g., the triangle encryption key) [8]. The decrypted copies of Slice 1 and Slice 2 are then transmitted to the client device (401) [10].

Upon receiving decrypted Slice 1 and Slice 2, the client device (401) combines Slice 1 and Slice 2 into a single scrambled file [11]. The single scrambled file is then unscrambled and reconstructed into the original file (426) [12]. This completes the file retrieval process.

End of Example

To further clarify embodiments of the invention, a non-limiting example is provided in FIGS. 5.1-5.7. In particular, FIGS. 5.1-5.7 show an example of a file recovery process. The numbers in the brackets below, e.g., "[1]", correspond to the same circled numbers in FIGS. 5.1-5.7.

Beginning of Example

Starting with FIG. 5.1, assume that the system of FIG. 5.1 is the same as the system shown in FIG. 4.1 at time stamp [6] of FIG. 4.1 where a file is successfully stored and the file system is in a complete state.

Based on this assumption and starting from this point in time, further now assume starting in FIG. 5.1 that storage device C (505C) has detected that it has been compromised [1]. Storage device C (505C) is then re-secured where all previously stored data slices and encryption keys (e.g., the diamond encryption key) are deleted [2].

Turning to FIG. 5.2, storage device C (505C) is designated as the new replica where a new encryption key (e.g., the new triangle encryption key that is different from the old diamond encryption key) is generated [3].

In FIG. 5.3, using its knowledge of the distribution order of the encrypted file slices, storage device C (505C) retrieves a usable copy of Slice 1 from storage device B (505B) [4]. Once the usable copy of Slice 1 is retrieved, storage device C (505C) further encrypts the encrypted copy retrieved from storage device B (505B) using its new encryption key to obtain a twice-encrypted Slice 1 [5].

In FIG. 5.4, storage device C (505C) transmits the twice-encrypted Slice 1 to storage device A (505A), which it knows is the storage device that is able to decrypt one of the encryptions on the twice-encrypted Slice 1 [6]. Storage device A (505A) decrypts the twice-encrypted Slice 1 such that the twice-encrypted Slice 1 is now only encrypted using the new encryption key of storage device C (505C) [7]. Storage device A (505A) then transmits Slice 1 encrypted using only the new encryption key of storage device C (505C) back to storage device C (505C) [8].

At this point, as shown in FIG. 5.5, storage device C (505C) makes a copy of Slice 1 encrypted using only the new encryption key of storage device C (505C) and transmits this copy to storage device A (505A) such that storage device A (505A) may replace Slice 1 encrypted using the old diamond encryption key of storage device C (505C) with the new Slice 1 encrypted using only the new encryption key of storage device C (505C) [9].

In FIG. 5.6, storage device C (505C) transmits Slice 1 encrypted using only the new encryption key of storage device C (505C) to storage device B (505B) [10]. Storage device B (505B) encrypts Slice 1 encrypted using only the new encryption key of storage device C (505C) using its own encryption key to obtain a twice-encrypted Slice 1 [11]. This twice-encrypted Slice 1 is then transmitted back to storage device C (505C) [12]. Upon receipt, storage device C (505C) decrypts the twice-encrypted Slice 1 using its own new encryption key to obtain a Slice 1 that is only encrypted using the encryption key of storage device B (505B), which completes the restoration of Slice 1 in re-secured storage device C (505C) [13].

Finally, as shown in FIG. 5.7, a similar process is repeated to restore Slice 2 in storage device C (505C) such that the file system is restored back to its state at time stamp [6] of FIG. 4.1 [14].

End of Example

FIG. 6 shows a computer system in accordance to one or more embodiments.

Embodiments disclosed herein may be implemented using computing devices. FIG. 6 shows a diagram of a computing device in accordance with one or more embodiments disclosed herein. Computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), communication interface (612) (e.g., Bluetooth interface, infrared interface, network interface, optical interface, etc.), input devices (610), output devices (608), and numerous other elements (not shown) and functionalities. Each of these components is described below.

In one embodiment disclosed herein, computer processor(s) (602) may be an integrated circuit for processing instructions. For example, the computer processor(s) may be one or more cores or micro-cores of a processor. Computing device (600) may also include one or more input devices (610), such as a touchscreen, keyboard, mouse, microphone, touchpad, electronic pen, or any other type of input device. Further, communication interface (612) may include an integrated circuit for connecting computing device (600) to a network (not shown) (e.g., a local area network (LAN), a wide area network (WAN) such as the Internet, mobile network, or any other type of network) and/or to another device, such as another computing device.

In one embodiment disclosed herein, computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (602), non-persistent storage (604), and persistent storage (606). Many different types of computing devices exist, and the aforementioned input and output device(s) may take other forms.

The advantages discussed above throughout the detailed description should be understood as being examples associated with one or more problems being solved by embodiments of the invention. However, one or more embodiments of the invention disclosed herein should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A first storage device among a plurality of storage devices of a file system comprising the first storage device, a second storage device, and a third storage device, the first storage device comprising:
   a storage that stores:
      an original first encryption key associated with the first storage device;
      a first copy of a first slice of a file, wherein the first copy of the first slice is encrypted using a second encryption key associated with the second storage device; and
      a first copy of a second slice of the file, wherein the first copy of the second slice is encrypted using a third encryption key associated with the third storage device; and
   a processor coupled to the storage, wherein the processor is configured to execute a file recovery method comprising:
      detecting that the first storage device is compromised and deleting the first copy of the first slice, the first copy of the second slice, and the original first encryption key from the storage;
      after the deleting:
         generating a new first encryption key different from the original first encryption key;
         executing a first replacement to replace copies of slices of the file on the second storage device and the third storage device encrypted using the original first encryption key with new copies of slices of the file encrypted with the new first encryption key; and
         executing a second replacement to replace the deleted first copy of the first slice and the deleted first copy of the second slice with a new copy the first slice encrypted with the second encryption key and a new copy of the second slice encrypted with the third encryption key.

2. The first storage device of claim 1, wherein the first replacement and the second replacement further comprises, after the generating of the new first encryption key different from the original first encryption key:
   copying, from the second storage device, a second copy of the first slice to the storage, wherein the second copy of the first slice is encrypted using the third encryption key;
   further encrypting the second copy of the first slice that is encrypted with the third encryption key using the new first encryption key to obtain a twice encrypted version of the second copy of the first slice;
   transmitting the twice encrypted version of the second copy of the first slice to the third storage device to be decrypted by the third storage device using the third encryption key, and receiving back from the third storage device the second copy of the first slice that is only encrypted using the new first encryption key;
   transmitting, to the third storage device, a copy of the second copy of the first slice that is only encrypted using the new first encryption key as one of the new copies of the slices of the file encrypted with the new first encryption key;
   transmitting, after transmitting the copy of the second copy of the first slice, the second copy of the first slice that is only encrypted using the new first encryption key to the second storage device, and receiving back the second copy of the first slice encrypted with both the second encryption key and the new first encryption key; and
   decrypting the second copy of the first slice encrypted with both the second encryption key and the new first encryption key using the new first encryption key to obtain the new copy the first slice encrypted with the second encryption key.

3. The first storage device of claim 2, wherein the copy of the second copy of the first slice that is only encrypted using the new first encryption key is transmitted to the third storage device with instructions that causes the third storage device to replace an existing copy of the first slice stored on the third storage device encrypted using the original first encryption key with the copy of the second copy of the first slice that is only encrypted using the new first encryption key.

4. The first storage device of claim 1, wherein the first replacement and the second replacement further comprises, after the generating of the new first encryption key different from the original first encryption key:
   copying, after the deleting and from the third storage device, a third copy of the second slice to the storage, wherein the third copy of the second slice is encrypted using the second encryption key;
   further encrypting the third copy of the second slice that is encrypted with the second encryption key using the new first encryption key to obtain a twice encrypted version of the third copy of the second slice;
   transmitting the twice encrypted version of the third copy of the second slice to the second storage device to decrypted by the second storage device using the second encryption key, and receiving back from the second storage device the third copy of the second slice that is only encrypted using the new first encryption key;
   transmitting, to the second storage device, a copy of the third copy of the second slice that is only encrypted using the new first encryption key as one of the new copies of the slices of the file encrypted with the new first encryption key;

transmitting, after transmitting the copy of the third copy of the second slice, the third copy of the of the second slice that is only encrypted using the new first encryption key to the third storage device, and receiving back the third copy of the second slice encrypted with both the third encryption key and the new first encryption key; and decrypting the third copy of the second slice encrypted with both the third encryption key and the new first encryption key using the new first encryption key to obtain the new copy of the second slice encrypted with the third encryption key.

5. The first storage device of claim 1, wherein the first storage device is configured to employ a commutative encryption method and the plurality of encryption keys are all different.

6. The first storage device of claim 1, wherein the file is divided into n−1 slices where n is a total number of the plurality of storage devices making up the file system.

7. The first storage device of claim 6,
wherein the original first encryption key, the new first encryption key, the second encryption key, and the third encryption key are part of a plurality of encryption keys of the file system, and
wherein each slice of the file is encrypted using a different one of the plurality of encryption keys and distributed to one of the plurality of storage devices based on:
the different one of the plurality of encryption keys;
a number of the slice; and
the total number of the plurality of storage devices.

8. A file recovery method executed by a first storage device among a plurality of storage devices of a file system comprising the first storage device, a second storage device, and a third storage device, the file recovery method comprising:
detecting that the first storage device is compromised and deleting from a storage of the first storage device:
an original first encryption key associated with the first storage device;
a first copy of a first slice of a file, wherein the first copy of the first slice is encrypted using a second encryption key associated with the second storage device; and
a first copy of a second slice of the file, wherein the first copy of the second slice is encrypted using a third encryption key associated with the third storage device
after the deleting:
generating a new first encryption key different from the original first encryption key;
executing a first replacement to replace copies of slices of the file on the second storage device and the third storage device encrypted using the original first encryption key with new copies of slices of the file encrypted with the new first encryption key; and
executing a second replacement to replace the deleted first copy of the first slice and the deleted first copy of the second slice with a new copy the first slice encrypted with the second encryption key and a new copy of the second slice encrypted with the third encryption key.

9. The file recovery method of claim 8, wherein the first replacement and the second replacement further comprises, after the generating of the new first encryption key different from the original first encryption key:

copying, from the second storage device, a second copy of the first slice to the storage, wherein the second copy of the first slice is encrypted using the third encryption key;

further encrypting the second copy of the first slice that is encrypted with the third encryption key using the new first encryption key to obtain a twice encrypted version of the second copy of the first slice;

transmitting the twice encrypted version of the second copy of the first slice to the third storage device to be decrypted by the third storage device using the third encryption key, and receiving back from the third storage device the second copy of the first slice that is only encrypted using the new first encryption key;

transmitting, to the third storage device, a copy of the second copy of the first slice that is only encrypted using the new first encryption key as one of the new copies of the slices of the file encrypted with the new first encryption key;

transmitting, after transmitting the copy of the second copy of the first slice, the second copy of the first slice that is only encrypted using the new first encryption key to the second storage device, and receiving back the second copy of the first slice encrypted with both the second encryption key and the new first encryption key; and decrypting the second copy of the first slice encrypted with both the second encryption key and the new first encryption key using the new first encryption key to obtain the new copy the first slice encrypted with the second encryption key.

10. The file recovery method of claim 8, wherein the first replacement and the second replacement further comprises, after the generating of the new first encryption key different from the original first encryption key:

copying, after the deleting and from the third storage device, a third copy of the second slice to the storage, wherein the third copy of the second slice is encrypted using the second encryption key;

further encrypting the third copy of the second slice that is encrypted with the second encryption key using the new first encryption key to obtain a twice encrypted version of the third copy of the second slice;

transmitting the twice encrypted version of the third copy of the second slice to the second storage device to decrypted by the second storage device using the second encryption key, and receiving back from the second storage device the third copy of the second slice that is only encrypted using the new first encryption key;

transmitting, to the second storage device, a copy of the third copy of the second slice that is only encrypted using the new first encryption key as one of the new copies of the slices of the file encrypted with the new first encryption key;

transmitting, after transmitting the copy of the third copy of the second slice, the third copy of the of the second slice that is only encrypted using the new first encryption key to the third storage device, and receiving back the third copy of the second slice encrypted with both the third encryption key and the new first encryption key; and decrypting the third copy of the second slice encrypted with both the third encryption key and the new first encryption key using the new first encryption key to obtain the new copy of the second slice encrypted with the third encryption key.

11. The file recovery method of claim 8, wherein the first storage device is configured to employ a commutative encryption method and the plurality of encryption keys are all different.

12. The file recovery method of claim 9, wherein the copy of the second copy of the first slice that is only encrypted using the new first encryption key is transmitted to the third storage device with instructions that causes the third storage device to replace an existing copy of the first slice stored on the third storage device encrypted using the original first encryption key with the copy of the second copy of the first slice that is only encrypted using the new first encryption key.

13. The file recovery method of claim 8, wherein the file is divided into n−1 slices where n is a total number of the plurality of storage devices making up the file system.

14. The file recovery method of claim 13,
wherein the original first encryption key, the new first encryption key, the second encryption key, and the third encryption key are part of a plurality of encryption keys of the file system, and
wherein each slice of the file is encrypted using a different one of the plurality of encryption keys and distributed to one of the plurality of storage devices based on:
the different one of the plurality of encryption keys;
a number of the slice; and
the total number of the plurality of storage devices.

15. A non-transitory computer readable medium (CRM) comprising computer readable program code, which when executed by a computer processor of a first storage device among a plurality of storage devices of a file system comprising the first storage device, a second storage device, and a third storage device enables the first storage device to perform a file recovery method, the file recovery method comprising:
detecting that the first storage device is compromised and deleting from a storage of the first storage device:
an original first encryption key associated with the first storage device;
a first copy of a first slice of a file, wherein the first copy of the first slice is encrypted using a second encryption key associated with the second storage device; and
a first copy of a second slice of the file, wherein the first copy of the second slice is encrypted using a third encryption key associated with the third storage device
after the deleting:
generating a new first encryption key different from the original first encryption key;
executing a first replacement to replace copies of slices of the file on the second storage device and the third storage device encrypted using the original first encryption key with new copies of slices of the file encrypted with the new first encryption key; and
executing a second replacement to replace the deleted first copy of the first slice and the deleted first copy of the second slice with a new copy the first slice encrypted with the second encryption key and a new copy of the second slice encrypted with the third encryption key.

16. The CRM of claim 15, wherein the first replacement and the second replacement further comprises, after the generating of the new first encryption key different from the original first encryption key:
copying, from the second storage device, a second copy of the first slice to the storage, wherein the second copy of the first slice is encrypted using the third encryption key;
further encrypting the second copy of the first slice that is encrypted with the third encryption key using the new first encryption key to obtain a twice encrypted version of the second copy of the first slice;
transmitting the twice encrypted version of the second copy of the first slice to the third storage device to be decrypted by the third storage device using the third encryption key, and receiving back from the third storage device the second copy of the first slice that is only encrypted using the new first encryption key;
transmitting, to the third storage device, a copy of the second copy of the first slice that is only encrypted using the new first encryption key as one of the new copies of the slices of the file encrypted with the new first encryption key;
transmitting, after transmitting the copy of the second copy of the first slice, the second copy of the first slice that is only encrypted using the new first encryption key to the second storage device, and receiving back the second copy of the first slice encrypted with both the second encryption key and the new first encryption key; and
decrypting the second copy of the first slice encrypted with both the second encryption key and the new first encryption key using the new first encryption key to obtain the new copy the first slice encrypted with the second encryption key.

17. The CRM of claim 16, wherein the copy of the second copy of the first slice that is only encrypted using the new first encryption key is transmitted to the third storage device with instructions that causes the third storage device to replace an existing copy of the first slice stored on the third storage device encrypted using the original first encryption key with the copy of the second copy of the first slice that is only encrypted using the new first encryption key.

18. The CRM of claim 15, wherein the first storage device is configured to employ a commutative encryption method and the plurality of encryption keys are all different.

19. The CRM of claim 15, wherein the file is divided into n−1 slices where n is a total number of the plurality of storage devices making up the file system.

20. The CRM of claim 19,
wherein the original first encryption key, the new first encryption key, the second encryption key, and the third encryption key are part of a plurality of encryption keys of the file system, and
wherein each slice of the file is encrypted using a different one of the plurality of encryption keys and distributed to one of the plurality of storage devices based on:
the different one of the plurality of encryption keys;
a number of the slice; and
the total number of the plurality of storage devices.

* * * * *